United States Patent
Mason

(10) Patent No.: US 8,764,857 B2
(45) Date of Patent: Jul. 1, 2014

(54) SYSTEM AND METHOD FOR DOWNDRAFT GASIFICATION

(75) Inventor: James Matthew Mason, Berkeley, CA (US)

(73) Assignee: All Power Labs, Inc., Berkeley, CA (US)

( * ) Notice: Subject to any disclaimer, the term of this patent is extended or adjusted under 35 U.S.C. 154(b) by 806 days.

(21) Appl. No.: 12/846,807

(22) Filed: Jul. 29, 2010

(65) Prior Publication Data

US 2011/0023363 A1 Feb. 3, 2011

Related U.S. Application Data

(60) Provisional application No. 61/229,413, filed on Jul. 29, 2009.

(51) Int. Cl.
*B01J 7/00* (2006.01)

(52) U.S. Cl.
USPC ............................................................. 48/61

(58) Field of Classification Search
None
See application file for complete search history.

(56) References Cited

U.S. PATENT DOCUMENTS

| | | | |
|---|---|---|---|
| 4,278,064 A | 7/1981 | Regueiro | |
| 4,488,364 A | 12/1984 | Herschel | |
| 5,393,315 A | 2/1995 | Alliston et al. | |
| 6,039,774 A | 3/2000 | McMullen et al. | |
| 6,112,677 A * | 9/2000 | Kuntschar et al. | 110/315 |
| 6,398,921 B1 * | 6/2002 | Moraski | 204/157.43 |
| 2004/0111968 A1 | 6/2004 | Day et al. | |
| 2005/0109603 A1 * | 5/2005 | Graham | 201/25 |
| 2005/0247553 A1 | 11/2005 | Ichikawa et al. | |
| 2006/0265954 A1 | 11/2006 | Dogru et al. | |
| 2007/0006528 A1 * | 1/2007 | Diebold et al. | 48/197 R |
| 2007/0089367 A1 | 4/2007 | Goddard | |
| 2007/0111051 A1 * | 5/2007 | Muradov | 429/17 |
| 2007/0220805 A1 | 9/2007 | Leveson et al. | |
| 2007/0220810 A1 | 9/2007 | Levenson et al. | |
| 2007/0245934 A1 | 10/2007 | Carman | |
| 2009/0239279 A1 * | 9/2009 | Hall et al. | 435/167 |
| 2010/0043291 A1 * | 2/2010 | Ljunggren | 48/197 FM |

FOREIGN PATENT DOCUMENTS

| | | |
|---|---|---|
| CN | 1277339 A | 12/2000 |
| EP | 2145939 A | 1/2010 |
| EP | 2374863 A | 10/2011 |

* cited by examiner

*Primary Examiner* — Imran Akram
(74) *Attorney, Agent, or Firm* — Jeffrey Schox

(57) ABSTRACT

A downdraft gasifier for producing a gaseous fuel to be used in an engine from a carbonaceous material with a pyrolysis module, a reactor module, and a heat exchanger system that cooperate to produce the gaseous fuel from the carbonaceous material and to extract particulates from the gaseous fuel from the reactor. The heat exchange system includes a first heat exchanger coupled to the dryer module that heats the carbonaceous material with the gaseous fuel output of the reactor module to dry the carbonaceous material; a second heat exchanger coupled to the pyrolysis module that heats the dried carbonaceous material with the exhaust from the engine to pyrolyze the dried carbonaceous material into tar gas and charcoal; and a third heat exchanger coupled to the reactor module that heats air used to combust the tar gas with the gaseous fuel output of the reactor module to preheat the air.

32 Claims, 9 Drawing Sheets

IDEAL THERMAL, MATERIAL AND PROCESS
RELATIONSHIPS IN A DOWNDRAFT GASIFIER

SYSTEM AND METHOD FOR DOWNDRAFT GASIFICATION

CROSS-REFERENCE TO RELATED APPLICATIONS

This application claims the benefit of U.S. Provisional Application No. 61/229,413 filed 29 Jul. 2009 and entitled "Waste Heat Recovery and Reuse in a Downdraft Gasifier-Engine System," which is incorporated in its entirety by this reference.

TECHNICAL FIELD

This invention relates generally to the gasifier field, and more specifically to an improved system and method for downdraft gasification in the downdraft gasifier field.

BACKGROUND

Gasifiers produce gaseous fuel that may be used in engines (for example, internal combustion engines that may be used to produce electricity and/or power vehicles) from carbonaceous material (for example, biomass and organic waste). Gasifiers conventionally use a combination of the following four reactions: combustion, reduction, pyrolysis, and drying. Fixed bed gasifiers (or "moving bed" gasifiers) are typically arranged as either an updraft gasifier type or a downdraft gasifier type. The updraft gasifier type utilizes the heat from the gas rising up from the combustion process to reduce, pyrolyze, and dry the carbonaceous material. As shown in FIG. 1, this allows for beneficial heat transfer between the processes (from high temperature reactions to lower temperature reactions). However, because the output gas goes through the pyrolyzing and drying processes last, the gas is relatively unclean and may include volatile tar gases and particulates that must be filtered and prepared before use. The downdraft gasifier type, however, dries the carbonaceous material, pyrolyzes the dried carbonaceous material into tar gas and charcoal, combusts the volatile tar gas, and finally reduces the combusted tar gas with the charcoal, thus producing relatively cleaner gaseous fuel than the updraft gasifier type. This may facilitate use of the gaseous fuel in the engine. However, the thermal and chemical relationships between successive stages in the downdraft gasifier are less than ideal for efficiency. For example, as shown in FIG. 2, heat is necessary to dry the carbonaceous material, but there is no obvious source of heat from within the downdraft gasification process. Similarly, pyrolysis occurs after drying, but the ideal temperature for pyrolysis is higher than that of drying, also necessitating heat input. Similarly, combustion occurs after pyrolysis, but the ideal temperature for combustion is higher than pyrolysis, again necessitating heat input. Also, in downdraft gasifiers where the processes are not adequately separated, higher temperature processes become parasitic loads on lower temperature processes, decreasing the effectiveness of the gasifier in converting carbonaceous material into gaseous fuel. For example, the drying process may become a parasitic load on the pyrolysis process, decreasing the effectiveness of the carbonaceous material to tar gas/charcoal conversion in the pyrolysis process and/or the pyrolysis process becomes a parasitic load on the combustion and/or reduction processes, decreasing the conversion effectiveness in the combustion and/or reduction processes. Additionally, gaseous fuel output from the reduction process is typically too hot to be used in an engine, and must be cooled. Also, any water content of the carbonaceous material is preferably substantially fully removed in the drying process to remove the thermal load of heating water in the pyrolysis and combustion processes. However, additional water may be beneficial in the reduction process, which occurs after the pyrolysis and combustion processes. While a downdraft gasifier may benefit from heat sources and material transporters in order to maintain the gasification process, the use of an external heat source and/or not effectively managing materials within the system will significantly decrease the effective carbonaceous material to gaseous fuel conversion of a downdraft gasifier and may decrease the viability of using the downdraft gasifier as an alternative energy source. Prior attempts in heat management within downdraft gasifiers (for example, using waste heat from one process to heat another) have also been substantially complicated, included many components, and expensive. Thus, there is a need in the downdraft gasifier field to create an improved system and method for heat and material management within a downdraft gasifier.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
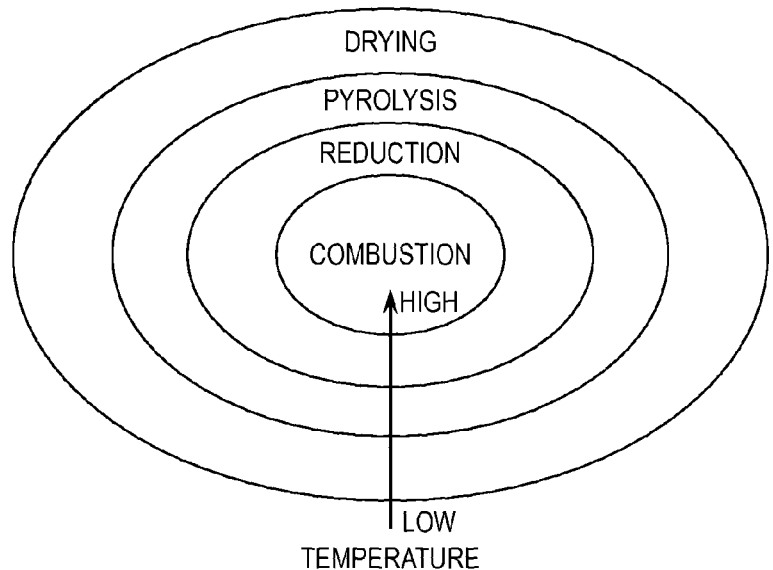
FIG. 1 is schematic representation of the ideal thermal and process relationships within an updraft gasifier.
Figure 2:
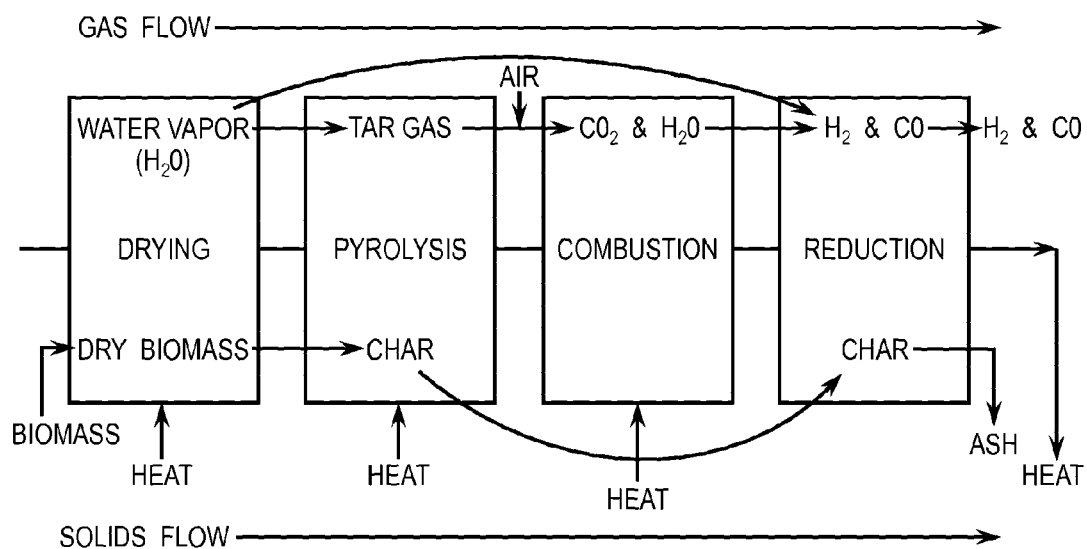
FIG. 2 is a schematic representation of the ideal material and process relationships within a downdraft gasifier.
Figure 3:
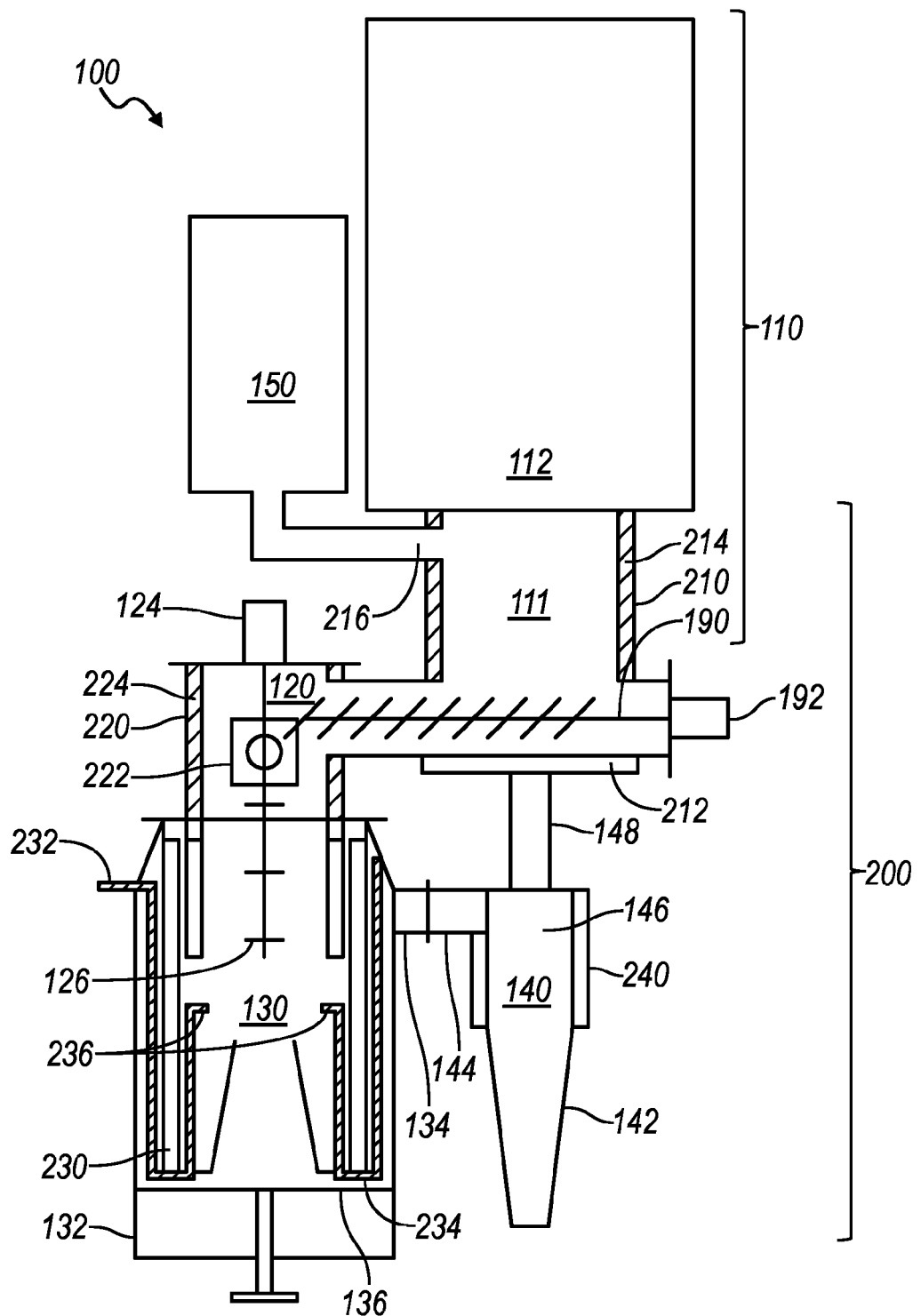
FIG. 3 is a schematic representation of the downdraft gasifier of the preferred embodiments.
Figure 4:
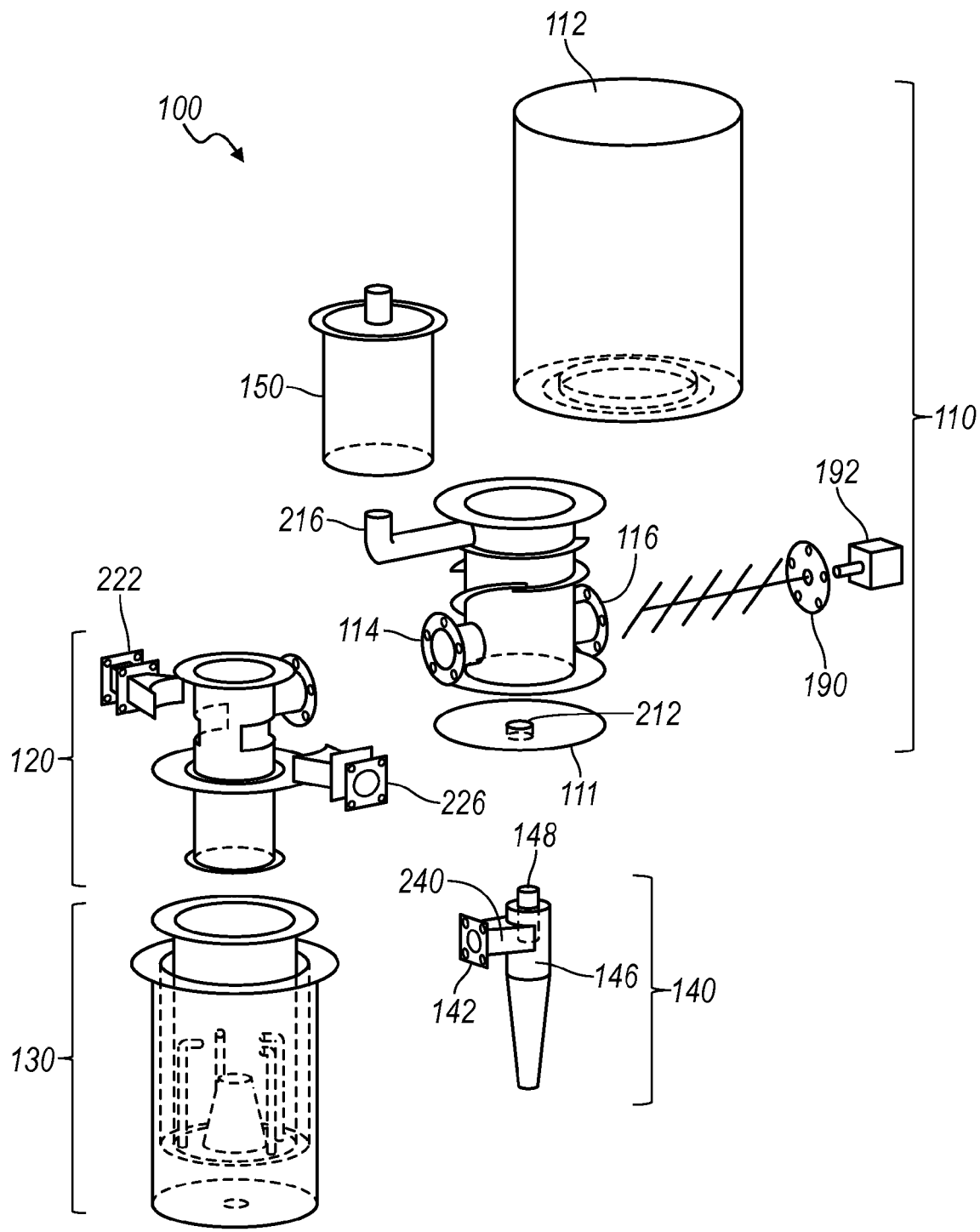
FIG. 4 is an exploded isometric view of the downdraft gasifier of the preferred embodiments.

As shown in FIGS. 3 and 4, the downdraft gasifier 100 of the preferred embodiments produces a gaseous fuel to be used in an engine from carbonaceous material, and includes a dryer module 110, a pyrolysis module 120, a reactor module 130, and a heat exchanger system 200 that cooperate to produce the gaseous fuel from the carbonaceous material and to extract particulates from the gaseous fuel. The heat exchanger system preferably includes a first heat exchanger 210 coupled to the dryer module no that heats the carbonaceous material with the gaseous fuel output of the reactor module 130 to dry the carbonaceous material and extract heat from the gaseous fuel; a second heat exchanger 220 coupled to the pyrolysis module 120 that heats the dried carbonaceous material with exhaust from the engine to pryolyze the dried carbonaceous material into tar gas and charcoal; and a third heat exchanger 330 coupled to the reactor module 130 that heats air used to combust the tar gas with gaseous fuel output of the reactor module 130 to preheat the air and to extract heat from the gaseous fuel output of the reactor module 130. As shown in FIG. 3, the downdraft gasifier 100 may also include a heat extractor 140 that further extracts heat from the gaseous fuel from the reactor module. The heat extractor 140 preferably includes a gaseous fuel inlet 144 that receives gasesous fuel from the reactor module, a gaseous fuel path 146 within the heat extractor 140 that extracts heat from the gaseous fuel, and a gaseous fuel outlet 148 that delivers gas to the first heat exchanger 210. The heat extractor 140 may include a cyclone module 142 that cooperates with the dryer module 110, the pyrolysis module 120, and the reactor module 130 to further extract particulates from the gaseous fuel. The heat extractor 140 may also include a fourth heat exchanger 240 that exchanges heat with the gaseous fuel to extract heat from the gaseous fuel. The fourth heat exchanger 240 may be coupled to the cyclone module 142. The fourth heat exchanger 240 may heat water with the gaseous fuel from the reactor module to heat and/or vaporize the water and to further extract heat from the gaseous fuel. The vaporized water may then be injected into the reactor module 130 to be used in reduction of the combusted tar gas with charcoal. The downdraft gasifier 100 may also include a filter 150 that further removes particulates and contaminants from the gaseous fuel output of the gasifier 100.

Figure 5:
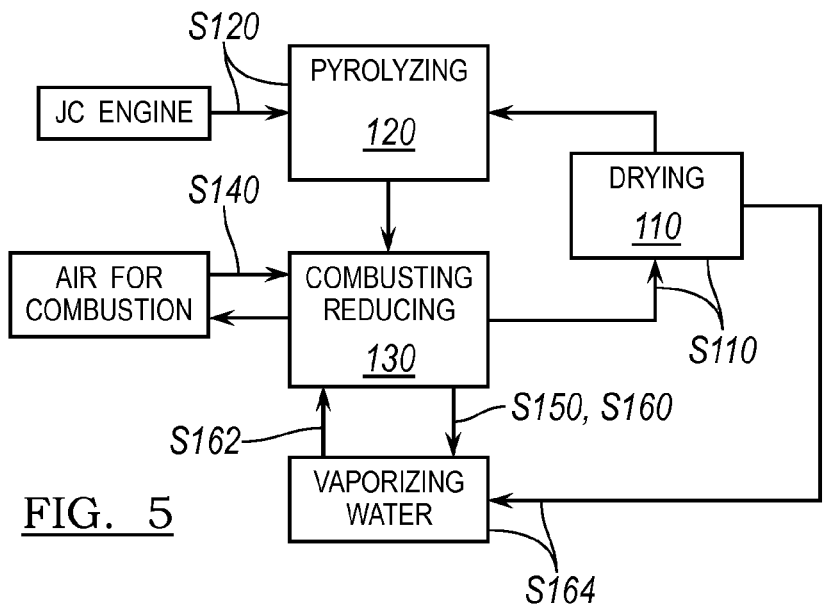
FIG. 5 is a schematic representation of method for heat management in downdraft gasifier of the preferred embodiments and the heat transfer relationships within the downdraft gasifier of the preferred embodiments.

As shown in FIG. 5, the method S100 for managing heat within a downdraft gasifier for producing a gaseous fuel from the carbonaceous material to be used in an engine preferably includes drying the carbonaceous material with the heat from the gaseous fuel output in a dryer module to produce dried carbonaceous material Step S110, pyrolyzing the dried carbonaceous material with the heat from the exhaust of the engine in a pyrolysis module to produce tar gas and charcoal Step S120, combusting the tar gas with air and reducing the combusted tar gas with the charcoal in a reactor module to produce gaseous fuel Step S130, preheating the air used to combust the tar gas with the gaseous fuel post reduction Step S140, and extracting heat post reduction prior to using the heat from the gaseous fuel to dry the carbonaceous material Step S150. The step of extracting heat post reduction prior to using the heat from the gaseous fuel to dry the carbonaceous material S150 may include the step of extracting particulates from the gaseous fuel in a cyclone module. The step of extracting heat post reduction S150 may also include the steps of vaporizing water with the heat from the gaseous fuel post reduction Step S160 and injecting the vaporized water into the reactor to be used in reduction Step S162. Extracting heat post reduction prior to using the heat from the gaseous fuel to dry the carbonaceous material Step S150 may alternatively be combined with preheating the air used to combust the tar gas with the gaseous fuel post reduction Step S140, for example, in variations of the downdraft gasifier 100 where preheating the air used to combust the tar gas decreases the temperature of the gaseous fuel post reduction to a suitable temperature for drying the carbonaceous material.

The dryer module 110 functions as the location where the incoming carbonaceous material is dried. More specifically, water content is removed from the carbonaceous material in the dryer module 110. The carbonaceous material may be any suitable type of material that includes carbon, for example, biomass (such as wood, plants, or algae), biodegradable waste (such as any waste generated by a plant or anima), and coal. The dryer module 110 preferably includes a carbonaceous fuel inlet 114 that allows carbonaceous fuel to enter the dryer module no and a carbonaceous fuel outlet 116 that allows the dried carbonaceous fuel to exit. The dried carbonaceous fuel is then preferably transported to the pyrolysis module 120 for pyrolyzing. As shown in FIG. 3, the dryer module no preferably includes a drying portion 111 that contains the carbonaceous material and a condensing portion 112 (also referred to as the "monorator hopper"). The condensing portion 112 is preferably arranged substantially above and in fluid communication with the drying portion 111. As the carbonaceous material is heated by the gaseous output of the reactor module 130, water content of the carbonaceous material is vaporized and rises upwards out of the drying portion 111 and into the monorator hopper 112. As the vaporized water contacts the wall of the monorator hopper 112, the water condenses and is removed from the carbonaceous material. By allowing the water to condense in a location away from the carbonaceous material, the amount of water that condenses back onto the carbonaceous material is substantially decreased. If water is allowed to condense back onto the carbonaceous material that is then transported into the pyrolysis module to be pyrolyzed, the extraneous water functions to increase the thermal load on the pyrolysis module, decreasing the efficiency of the pyrolysis process and the overall efficiency of the gasifier. Thus, the use of a condensing portion 112 that is removed from the carbonaceous material is substantially beneficial and advantageous. However, any other suitable arrangement of the dryer module 110 may be used.

The dryer module no is preferably of a generally cylindrical structure, but may alternatively be any other suitable geometry. The condensation portion 112 of the dryer module 110 is preferably of a larger diameter than the drying portion 111 to substantially prevent condensed water on the wall of the condensation portion 112 to fall back into the drying portion 111. However, the drying portion 111 and the condensation portion 112 may be of any other suitable arrangement. The cylindrical structure of the drying portion 111 preferably includes an inner jacket 118 that is formed by rolling a continuous piece of sheet metal and preferably includes flange rings coupled to the ends of the cylinder formed by the sheet metal and end plates fastened (for example, using nuts and bolts or any other suitable type of fastener) to the sheet metal and flange rings that substantially maintain the rolled shape of the sheet metal. The drying portion 111 preferably also includes an outer jacket 119 that is constructed using similar or identical materials and methods as the inner jacket that cooperates with the inner jacket to define an annular space between the inner and outer jackets. Similarly, the condensing portion 112 is also preferably constructed using similar or identical materials and methods as the inner jacket, and is preferably coupled to the drying portion 111 through the endplates. However, any other suitable construction of the dryer module 110 may be used. The sheet metal, endplates, and flange rings are preferably of a steel material, but may alternatively be aluminum, titanium, or any other suitable type of metal. Alternatively, the drying portion 111 may also be of square type or trapezoidal type structure, similarly constructed of sheet metal and end plates. However, any other suitable shape for the drying portion 111, condensing portion 112, or the dryer module 110 may be used.

Figures 6A, 6B:
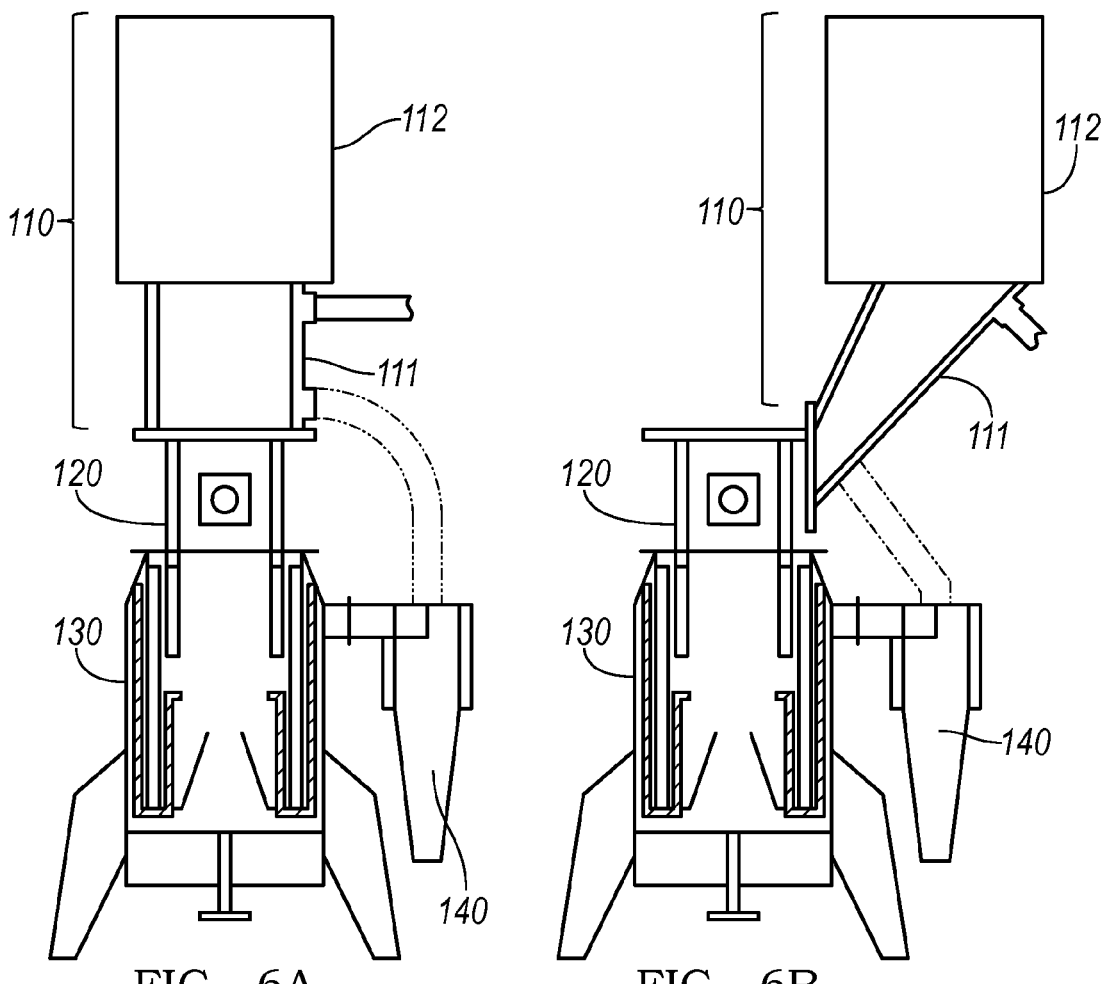
FIGS. 6a and 6b are schematic representations of alternative arrangements of the downdraft gasifier of the preferred embodiments.

The dryer module 110 is preferably separate from and arranged substantially adjacent to the pyrolysis module 120, as shown in FIG. 3, decreasing the water content that is transported with the dried carbonaceous material into the pyrolysis module 120. The downdraft gasifier 100 may include an auger that transports the dried carbonaceous material into the pyrolysis module 120. The rotation speed of the auger may be varied depending on the desired output of the gasifier (which may facilitate cleaner start ups and shut downs), the existing carbonaceous material content within the gasifier, and/or any other suitable factor. The auger may be hand driven, but may alternatively be coupled to a motor that automatically rotates the auger to regulate the carbonaceous material within the gasifier. However, any other suitable type of transporter may be used for the carbonaceous material. Alternatively, the dryer module 110 may be arranged above the pyrolysis module 120, as shown in FIG. 6. In this variation, gravity may be used to drop dried carbonaceous material into the pyrolysis module 120, decreasing the need for a driven material transporter and potentially decreasing the energy required to run the gasifier. Additionally, certain carbonaceous material may be difficult to transport using an auger. By utilizing gravity, material transport may be simplified and facilitated. Because water vapor condenses upwards, the water content of the carbonaceous material in this variation is substantially removed from the carbonaceous material prior to pyrolysis. However, any other suitable arrangement of the dryer module no relative to the pyrolysis module 120 may be used.

The first heat exchanger 210 is preferably arranged substantially within the annular space defined by the inner and outer jacket of the dryer module 110. The first heat exchanger 210 preferably includes a gaseous fuel inlet 212, a gaseous fuel path 214, and a gaseous fuel outlet 216. The gaseous fuel inlet 212 is may coupled directly to the third heat exchanger 230, but may alternatively be coupled to the heat extractor 140 to receive gaseous fuel that has been cooled by the heat extractor 140. The temperature of the gaseous fuel that exits directly from the reduction reaction in typical gasifers may be around 600° C. As further described below, the third heat exchanger may decrease the temperature of the gaseous fuel output of the reactor to around 200° C.-300° C. However, carbonaceous material may pyrolyze under this temperature range. As a result, it may be beneficial to further extract heat from the gaseous fuel output through the heat extractor 140 prior to heating the carbonaceous material with the gaseous fuel output, substantially isolating pyrolysis from drying. The temperature range of the gaseous fuel that is received by the gaseous fuel inlet 212 is preferably around 100° C.-220° C. More specifically, a temperature range of around 150° C.-220° C. may increase the drying rate without inducing pyrolysis. However, any other suitable temperature may be used.

The gaseous fuel path 214 of the first heat exchanger 210 preferably traverses about the dryer module no at least once, for example, in a zigzag pattern back and forth about the dryer module 110. The zigzag pattern may traverse across a portion of the surface area of outer wall of the inner jacket of the dryer module 110, but may alternatively traverse across substantially the whole surface area the outer wall of the inner jacket of the dryer module 110. The zigzag pattern may increase the efficiency of heat transfer from the gaseous fuel into the drying portion 111 to the carbonaceous material. The zigzag pattern also allows for cross-current flow, which also may increase heat transfer efficiency. Additionally, the zigzag pattern may also facilitate in breaking laminar flow within the gaseous fuel to increase heat transfer and particulate extraction from the gaseous fuel. However, any other suitable gaseous flow path may be used. The outer wall of the inner jacket and the inner wall of the outer jacket and the drying portion 111 preferably cooperatively define the gaseous flow path 214. To define the traversing pattern of the gaseous flow path 214, the inner wall of the outer jacket preferably includes baffles that cooperate with the outer wall of the inner jacket to define the gaseous fuel path and to direct the gaseous fuel in a traversing manner. However, the gaseous fuel path 214 may be defined using any other suitable material or method.

The gaseous fuel outlet 216 of the first heat exchanger 210 functions as the outlet of the gaseous fuel output of the downdraft gasifier 100. More specifically, the final product of the downdraft gasifier 100 is outputted through the gaseous fuel outlet 216 of the first heat exchanger 210. Through the first heat exchanger 210, the gaseous fuel is preferably cooled down to a temperature that is suitable to be used, for example, in an engine. As described above, gaseous fuel that is received in the gaseous fuel inlet 212 may be of a temperature within the range of 100° C.-220° C., which is too hot to be used in typical applications. Through using the heat from the gaseous fuel to dry the carbonaceous fuel, the gaseous fuel may be further cooled down to about 40° C., which is suitable for use in an engine. The downdraft gasifier 100 of the preferred embodiments utilizes heat from the gaseous fuel output to dry carbonaceous fuel, thereby cooling gaseous fuel output to a usable temperature and reducing the need for an external cooling system. However, any other suitable heat transfer and temperature relationship within the first heat exchanger 210 may be used. To further clean the gaseous fuel prior to use, the gaseous fuel outlet 216 may be coupled to a filter 150, as shown in FIGS. 3 and 4. The filter 150 may also function further cool the gaseous fuel.

The pyrolysis module 120 is preferably where the dried carbonaceous material is pyrolyzed into tar gas and charcoal. More specifically, the carbonaceous material is heated at a substantially high temperature (typically above 200° C.), in the substantial absence of oxygen, thus burning the carbonaceous material into volatile tar gas and charcoal. The volatility of tar gas and charcoal contributes substantially to later processes in gasification. The pyrolysis module 120 preferably includes a dried carbonaceous fuel inlet 122 that allows dried carbonaceous fuel from the dryer module 110 to enter the pyrolysis module 120 and a tar gas and charcoal outlet 128 that allows the tar gas and charcoal to exit the pyrolysis module 120, preferably into the reactor module 130. Similar to the drying portion of the dryer module in, the pyrolysis module 120 preferably also of a generally cylindrical structure that includes an inner jacket 126 and an outer jacket 125 that cooperatively define an annual space in between the inner jacket and the outer jacket. The pyrolysis module 120 is preferably constructed using similar or identical materials and methods as described above for the dryer module no, but may alternatively be constructed using any other suitable material and method.

The pyrolysis module 120 is preferably arranged above the reactor module 130 and is preferably attached to the reactor module 130 through flange rings and endplates, substantially similar to how the condensing portion 112 is attached to the drying portion 111 of the dryer module 110. However, any other suitable method of arranging the pyrolysis module 120 above the reactor module 130 may be used. As shown in FIG. 3, the tar gas and charcoal outlet 128 of the pyrolysis module 120 preferably extends into the reactor module 130, allowing tar gas and charcoal to exit the pyrolysis module 120 and directly into the reactor module 130 through gravity. The tar gas and charcoal outlet 128 may also include a motor 124 that drives the movement of the tar gas and charcoal into the reactor module 130. By controlling the amount of tar gas/charcoal may facilitate cleaner start ups and shut downs of the gasifier (for example, less unused carbonaceous material inside the reactor). Alternatively, the push force from additional tar gas and charcoal generated during pyrolysis and gravity may be used to naturally push the previously generated tar gas and charcoal out through the tar gas and charcoal outlet 128 into the reactor module 130. However, the tar gas and charcoal may be transported from the pyrolysis module 120 to the reactor module 130 using any other suitable method. While the tar gas and charcoal outlet 128 of the pyrolysis module 120 may extend into the reactor module, the heat from the reactor module 130 preferably does not substantially affect heat within the pyrolysis module 120, thus decreasing the thermal load on the reactor module 130. The depth that the tar gas and charcoal outlet 128 extends into the reactor is preferably where the temperature of the pyrolysis module 120 is substantially higher than that of the reactor module 130 at that particular level, discouraging heat transfer from the reactor module 130 into the pyrolysis module 120. However, any other suitable arrangement of the pyrolysis module 120 may be used.

Figure 7:
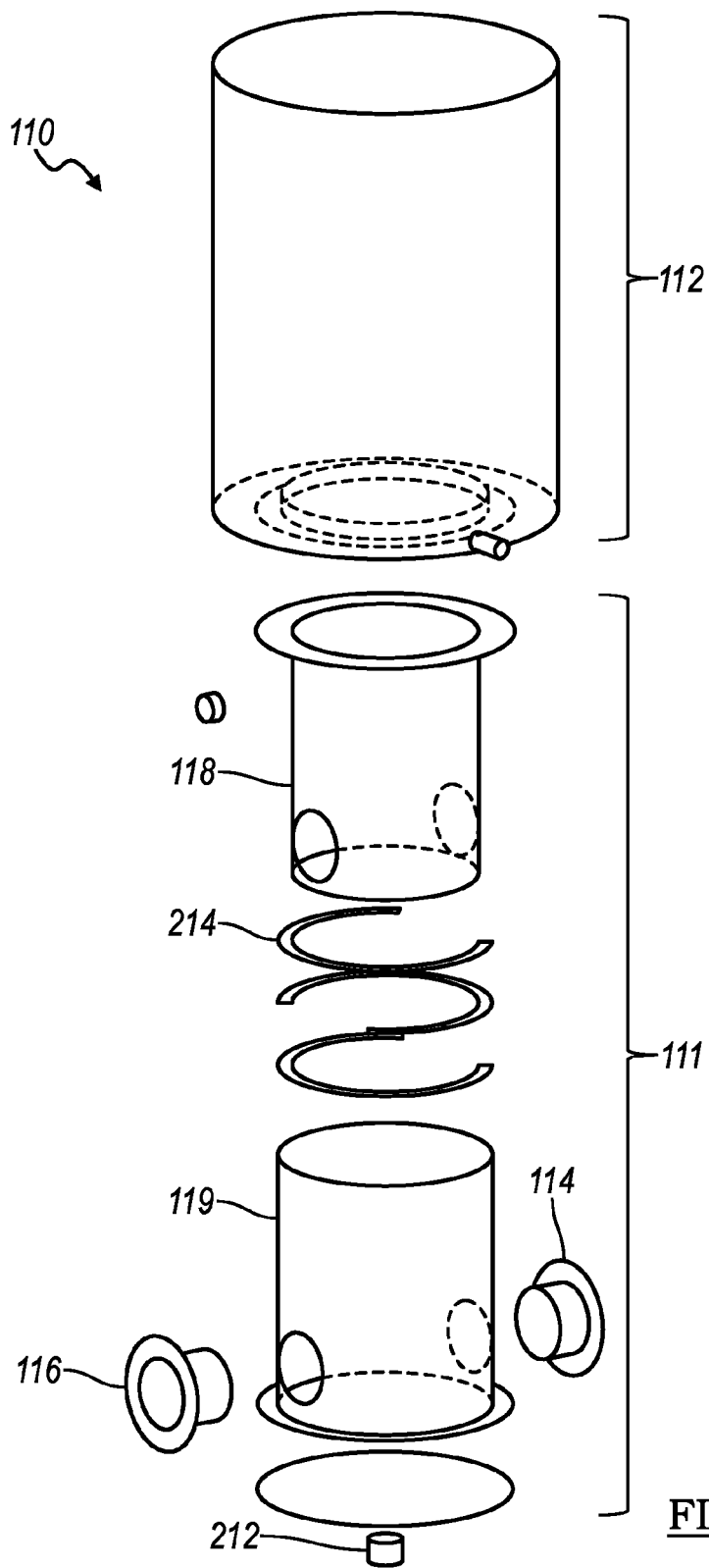
FIG. 7 is an exploded view of the dryer module of the preferred embodiments.
Figure 8:
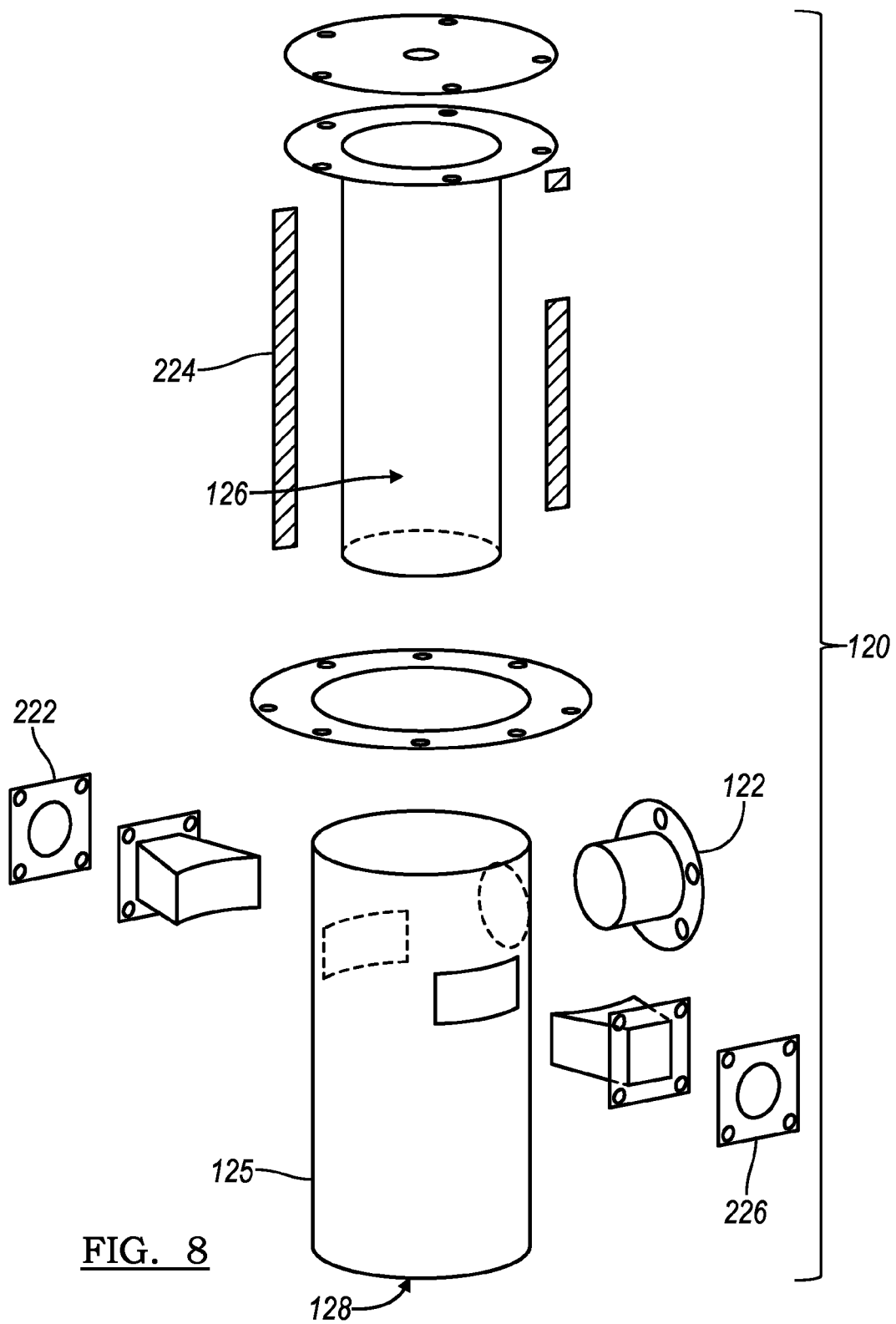
FIG. 8 is an exploded view of the pyrolysis module of the preferred embodiments.
Figure 9:
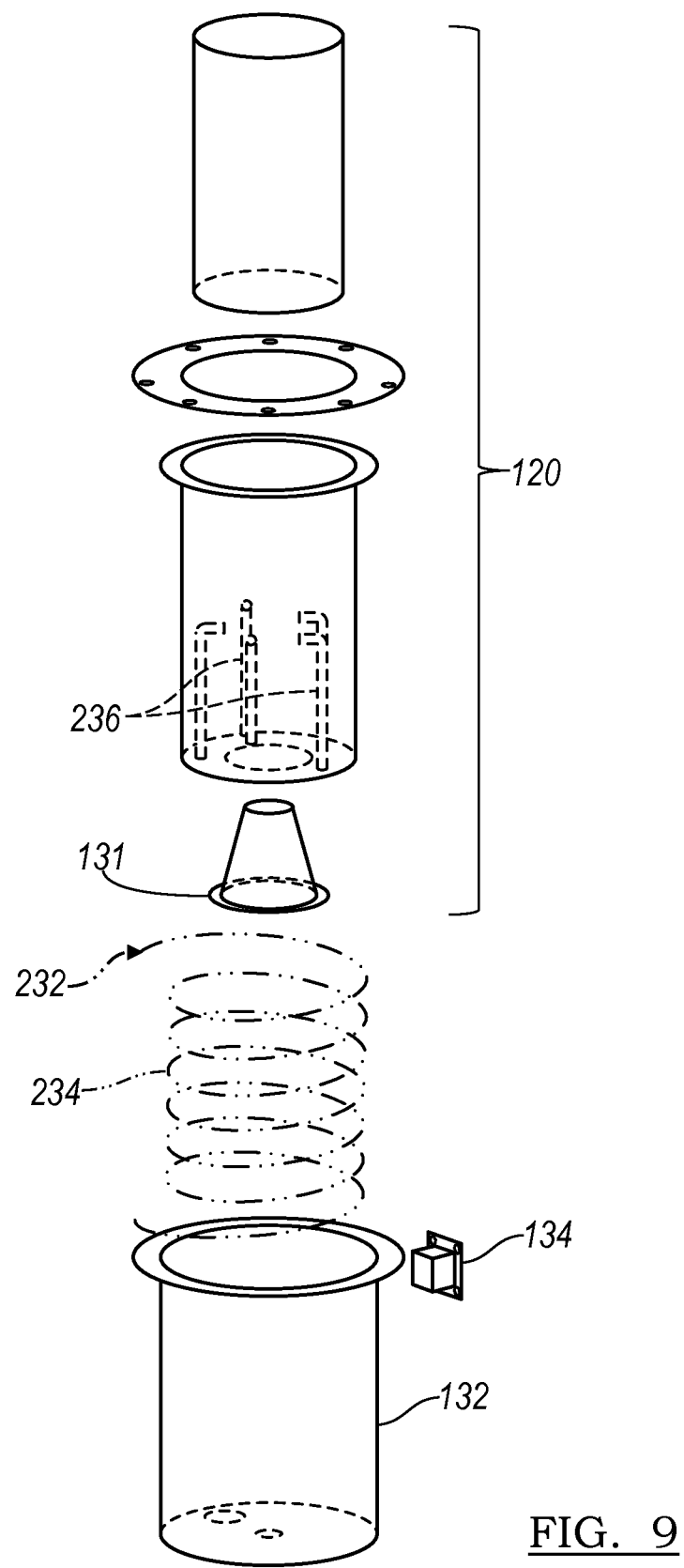
FIG. 9 is an exploded view of the reactor module and gas cowling of the preferred embodiments.
Figure 10:
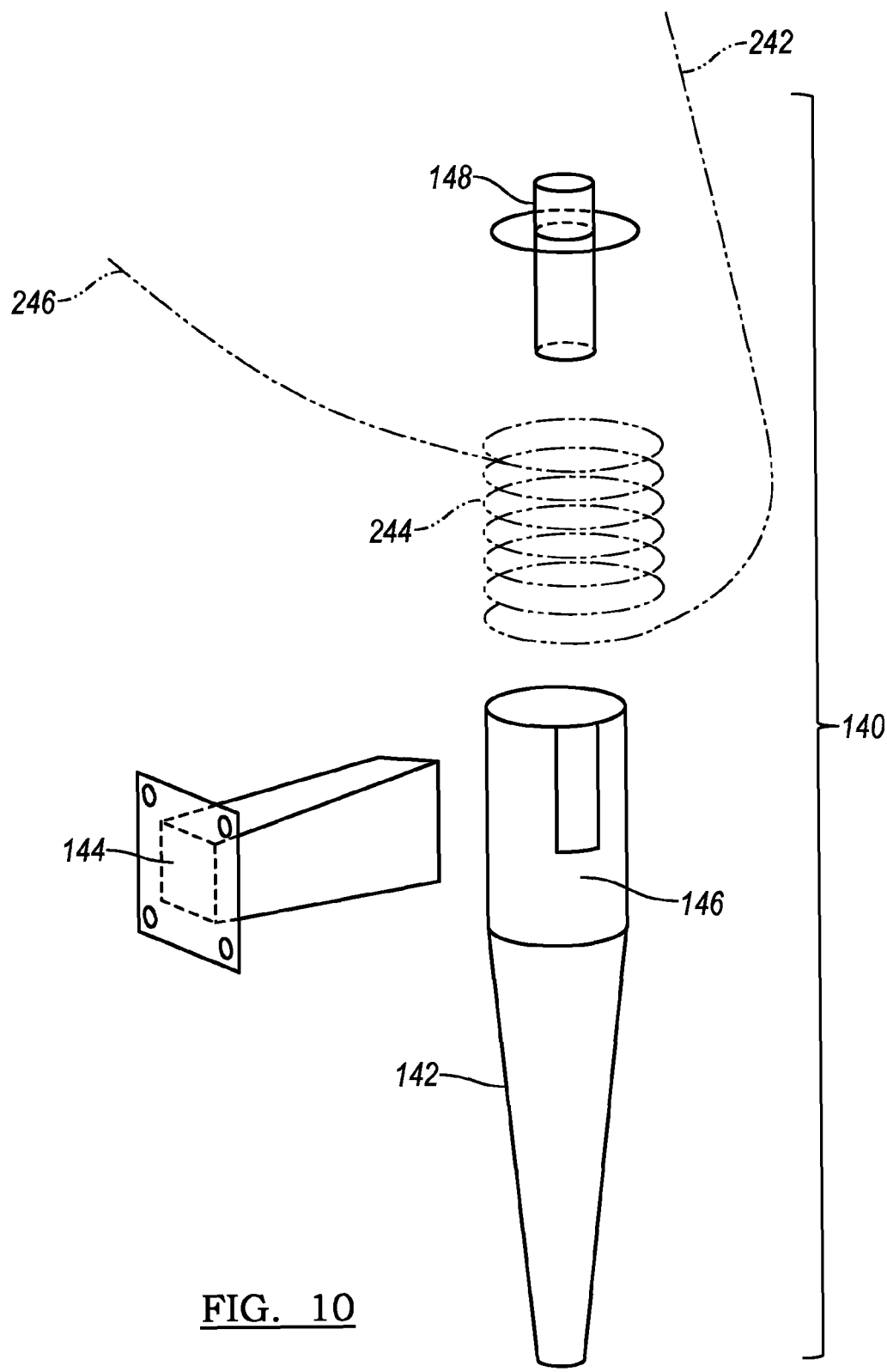
FIG. 10 to is an exploded view of the heat extractor.

The second heat exchanger 220 is preferably arranged substantially within the annular space defined by the inner and outer jackets of the pyrolysis module 120. The second heat exchanger 220 preferably includes an exhaust gas inlet 222, an exhaust gas path 224, and an exhaust gas outlet 226. The exhaust gas inlet 222 is preferably coupled to an engine, preferably, the engine that uses the gaseous fuel output from the gasifier, but may alternatively be any other suitable engine, and receives exhaust gas from the engine. The temperature of the exhaust gas that enters the exhaust gas inlet 222 may in the range of 600° C.-700° C. and the exhaust gas preferably contains enough heat energy to heat the dried carbonaceous material to temperatures that pyrolyze the dried carbonaceous material into tar gas and charcoal. Temperatures necessary to pyrolyze carbonaceous material may vary depending on the type of carbonaceous material, but are generally above 200° C. The exhaust gas path 224 is preferably substantially similar or identical to the gaseous fuel path 214 of the first heat exchanger 210 and traverses about the pyrolysis module 220 in a zigzag pattern. The exhaust gas path 224 is also preferably cooperatively defined by the inner and outer jackets of the pyrolysis module 220. As shown in FIG. 7, the exhaust gas path 224 may be preferably allows the exhaust gas inlet 222 and the exhauast gas outlet 226 to be on substantially the same level, allowing heat to be concentrated in substantial one region within the pyrolysis module and decreasing the size of the pyrolysis module 120. To spread air along the surface of the inner jacket 122, the inner and outer jackets may cooperative define baffles that divert incoming air towards a particular direction as opposed to defining an actual path, as shown in FIG. 7. However, the exhaust gas path 224 may traverse about the pyrolysis module 220 in any other suitable pattern and may be defined using any other suitable material and method. The exhaust gas outlet 226 preferably outputs the cooled exhaust gas to the ambient environment. In the second heat exchanger 220, the heat energy within the exhaust gas that would otherwise become wasted energy is used as a heat input to induce pyrolysis.

In certain usage scenarios, too much tar gas may be produced relative to the charcoal in the pyrolysis module 120. Too much tar gas relative to the charcoal may result in an imbalance between the combustion and reduction processes. To address this possible usage scenario, the pyrolysis module 120 may include a tar gas outlet that allows extra tar gas to exit the pyrolysis module to a burning module. The burning module preferably "burns" or combusts the tar gas, decreasing the volatility of the tar gas. As a result of the burning, the burned tar gas is at a substantially high temperature. The second heat exchanger may also include a burned tar gas inlet that routes the burned tar gas back to the pyrolysis module 120 to heat and pyrolyze the dried carbonaceous material. The burned tar gas may travel through the same path as the exhaust gas path 124, but the second heat exchanger may alternatively include a separate burned tar gas path that is substantially similar to the exhaust gas path 124. This alternative heat source may be used in conjunction with the exhaust gas for pyrolysis, but may alternatively be used independently of the exhaust gas. In particular, in certain usage scenarios, the gaseous fuel output may not be used in an engine, the engine may not be coupled to the downdraft gasifier 100, or the engine may malfunction. In such usage scenarios, the burned tar gas may be used as the heat source for pyrolysis, substantially eliminating the dependency on the engine. However, any other suitable heat transfer and temperature relationship within the second heat exchanger 220 may be used.

The reactor module 130 is preferably where the tar gas is combusted and the combusted tar gas is reduced with the charcoal. More specifically, the tar gas is put into contact with oxygen at combustion temperatures to combust, and the combusted tar gas is put into contact with the charcoal to reduce into carbon monoxide (CO) and hydrogen ($H_2$), which can then be used as gaseous fuel. As described above, the tar gas and charcoal enters the reactor module 130 from the tar gas and charcoal outlet 128 of the pyrolysis module 120. The reactor module 130 is preferably of the Imbert reactor type, but may alternatively be any other suitable reactor type. The reactor module 130 is preferably placed inside a gas cowling 132 that substantially envelops the reactor module 130. The gas cowling 132 is also preferably composed of sheet metal, flange rings, and end plates that maintain the shape and fasten the gas cowling to the reactor module 130. The gas cowling 132 preferably accommodates to a variety of types of reactors. The gas cowling 132 and the reactor module 130 preferably cooperate to define an annular space between the reactor module 130 and the gas cowling 132. The gaseous fuel outlet 131 of the reactor module 130 is preferably located at the bottom of the reactor module such that the gaseous fuel exits after the reduction reaction from the bottom of the reactor and is directed upwards and around the reactor module 130 by the gas cowling 132. The annular space between the reactor module 130 and the gas cowling 132 preferably includes a gaseous fuel outlet 134 located substantially near the top of the gas cowling that outputs the gaseous fuel to the drying module 130, heat extractor 140, the cyclone module 142, and/or the fourth heat exchanger 240. However, any other arrangement suitable arrangement of the reactor module 130 may be used.

The third heat exchanger 230 is preferably arranged substantially within the annual space defined by the reactor module 130 and the gas cowling 132. As described above, the gaseous fuel output is directed to flow up and around the reactor module 130 within the annular space substantially from the bottom of the gas cowling 132 up to the substantially the top of the gas cowling. The third heat exchanger 230 utilizes this flow of the gaseous fuel to preheat the air used to combust the tar gas within the reactor module 130. As shown in FIG. 3, the first heat exchanger preferably includes an air inlet 232, an air path 234, and an air outlet 236. The air inlet 232 preferably receives air, for example, ambient air or any other suitable air that includes a suitable amount of oxygen. The air inlet 232 is preferably located substantially near the top of the gas cowling 132. The air path 234 preferably traverses about the reactor module 130 at least once, for example, the air path 234 is defined by thermally conductive tubing (for example, steel tubing) that is wrapped around the reactor module 130 at least one revolution directed towards the bottom of the gas cowling 132, however, any other suitable material or method may be used to define the air path 234. By allowing the air path to revolve around the reactor module 130, the air path 234 is lengthened (as compared to an air path that travels substantially in a straight line from the top to the bottom of the gas cowling 132) and total heat transfer within the third heat exchanger 230 is substantially increased. The air outlet 236 is preferably coupled to the interior of the reactor module 130, as shown in FIG. 3, injecting air and allowing combustion (and subsequently, reduction) of the tar gas. As described above, the gaseous fuel output of the reactor is traveling upwards within the same annular space where the air path 234 is contained. This allows for the gaseous fuel output to heat the air within the air path 234 prior to injection into the reactor module 130. In other words, the third heat exchanger 230 recaptures the heat energy from gaseous fuel output of the reactor module 130 and reuses it in the reactor module 130, potentially providing a significant increase in energy production efficiency of the downdraft gasifier too. As shown in FIG. 3, the air path 234 wraps around substantially the bottom of the reactor module 130 prior to entering the interior of the reactor module 130, allowing the air path 234 to traverse substantially the entire length of the gas cowling 132/reactor module 130, further increasing the distance over which the gaseous fuel output of the reactor module 130 can transfer heat to the air. This arrangement of the flow of air and gaseous fuel output substantially increases the output temperature of the air through the air outlet 236 and substantially decreases the output temperature of the gaseous fuel outlet 134 of the gas cowling 132. Additionally, as a result of the heat transfer, the temperature of the reactor module 130 is substantially lower at the top than at the bottom, allowing the pyrolysis module 120 to be inserted into the reactor module 130 without substantial heat transfer from the reactor module 130 to the pyrolysis module 120 and facilitating transport of tar gas and charcoal into the reactor module 130.

By locating the gaseous fuel outlet from the reactor module 130 substantially at the bottom of the gas cowling 132, the gaseous fuel outlet 134 from the gas cowling substantially at the top of the gas cowling 132, the air inlet 232 substantially at the top of the gas cowling 132, and routing the air path 234 substantially to the bottom of the gas cowling 132, counter current flow is induced between the gaseous fuel output from the reactor module 130 and the air within the air path 234. This counter current flow is beneficial for heat transfer. Additionally, as the gaseous fuel output flows across the air path 234, turbulence is introduced into the gaseous fuel output flow, which may improve particulate separation from gaseous fuel, cleaning the gaseous fuel. As described above, the gaseous fuel output after reduction may be at a temperature around 600° C. Through the third heat exchanger 230, the gaseous fuel output may be decreased to a temperature in the range of 200° C.-300° C. However, the third heat exchanger 230 may decrease the temperature even more, decreasing the need for the heat extractor 140. However, any other suitable heat transfer and temperature relationship within the third heat exchanger may be used.

As shown in FIG. 3, the gas cowling 132 may also include a sediment collector 136 located below the reactor module 130 that collects particulates that are extracted from the gaseous fuel and/or the ash that results from the charcoal after the combusted tar gas is reduced with the charcoal. The sediment collector 132 is preferably removable to allow for the sediments to be disposed of after use. However, any other suitable arrangement of the sediment collector maybe used.

In the preferred embodiments, the downdraft gasifier further includes a heat extractor 140 that further extracts heat from the gaseous fuel output prior to using the heat to dry the carbonaceous material. The heat extractor 140 may be a radiator that radiates out heat from the gaseous fuel output to the ambient environment. The heat extractor 140 preferably includes a gaseous fuel input 144 that receives gaseous fuel from the gaseous fuel outlet 134 of the gas cowling 132 and a gaseous fuel output 146 that is coupled to the gaseous fuel inlet 212 of the first heat exchanger 210. As shown in FIG. 3, the heat extractor 140 may include a cyclone module 142 that functions to further extract particulates from the gaseous fuel output. In the process of routing the gaseous fuel through the cyclone module 142, heat is radiated out into the ambient environment. The heat extractor 140 and/or the cyclone module 142 may also include heat radiating features (for example, heat fins) that facilitate the extraction of heat from the gaseous fuel output. The heat extractor 140 and/or the cyclone module 142 is preferably arranged substantially underneath the first heat exchanger 210 to utilize the tendency for hot gas to rise to direct the gaseous fuel into the first heat exchanger 210. However, any other suitable arrangement of the heat extractor and/or the cyclone module 142 may be used.

Alternatively, the heat extractor 140 may include a fourth heat exchanger 240 that uses the heat energy from the gaseous fuel to do work, for example, to heat water. In a first variation, the fourth heat exchanger includes a water inlet 242, a water path 244, and a water outlet 246. The water inlet preferably receives water from a water source. The water path preferably traverses about the heat extractor 140 and/or cyclone 142 and the gaseous fuel is used to heat the water. The temperature of the gaseous fuel may be high enough to vaporize the water, allowing steam to exit through the water outlet. The introduction of water in the reduction process may increase the amount of usable gaseous fuel that is produced in the gasifier without increasing the amount of carbonaceous material used. Increasing the amount of carbonaceous material increases the amount of air that is used in gaseous fuel production, which may increase the nitrogen content within the gaseous fuel and dilute the usable gaseous fuel. Thus, introducing steam into the reactor may produce higher quality gaseous fuel. Additionally, the introduction of steam into combustion may also provided added benefits of reducing soot reduction and facilitating combustion. The water outlet may alternatively be coupled to the air path 234 of the third heat exchanger 230. In this variation of the fourth heat exchanger 240, heat is recaptured from the gaseous fuel output of the reactor module 130 and reused in the reactor module 130 (through the production of steam and injection of the steam), potentially providing a significant increase in energy production efficiency of the downdraft gasifier 100. A second variation of the fourth heat exchanger 240 is substantially similar to the first variation. In the second variation, the water source for the fourth heat exchanger 240 is the water content that is removed from the carbonaceous material in the dryer module 110. As described above, water is collected in the condensing portion 112 of the dryer module 110. In this variation, the condensing portion 112 may include a water outlet that is coupled to the water inlet of the fourth heat exchanger to be heated and/or injected into the reactor. In addition to recycling the water content within the system, the water collected in the dryer module was also heated by heat from the gaseous fuel output, thus adding another layer of recapturing and reusing thermal energy within the downdraft gasifier 100. However, any other suitable arrangement, heat transfer, material, and temperature relationship for the heat extractor 140 may be used.

In addition to increasing efficiencies through heat and material recycling, the downdraft gasifier 100 of the preferred embodiments also substantially isolates major chemical reactions from each other, as described above, which decreases unnecessary thermal load and may produce cleaner gaseous fuel. For example, unnecessary water content in the pyrolysis process and combustion process becomes a thermal load and may decrease the efficiency of both processes. Similarly, heat from higher temperature reactions is substantially isolated from entering lower temperature reactions, which may improve quality of the gaseous fuel output. Similarly, poorly managing heat within the reactor and allowing heat to escape the reactor (for example, into the pyrolysis or drying processes) may decrease the efficiency of combustion and reduction. The connections between each of the modules are preferably substantially short while maintaining substantial isolation between modules and heat exchangers to decrease heat loss as materials move between modules and heat exchangers. Similarly, each of the modules and heat exchangers may include insulation to further prevent undesired heat loss (as well as to protect a user that may come into contact with a surface of the downdraft gasifier 100).

Figure 11:
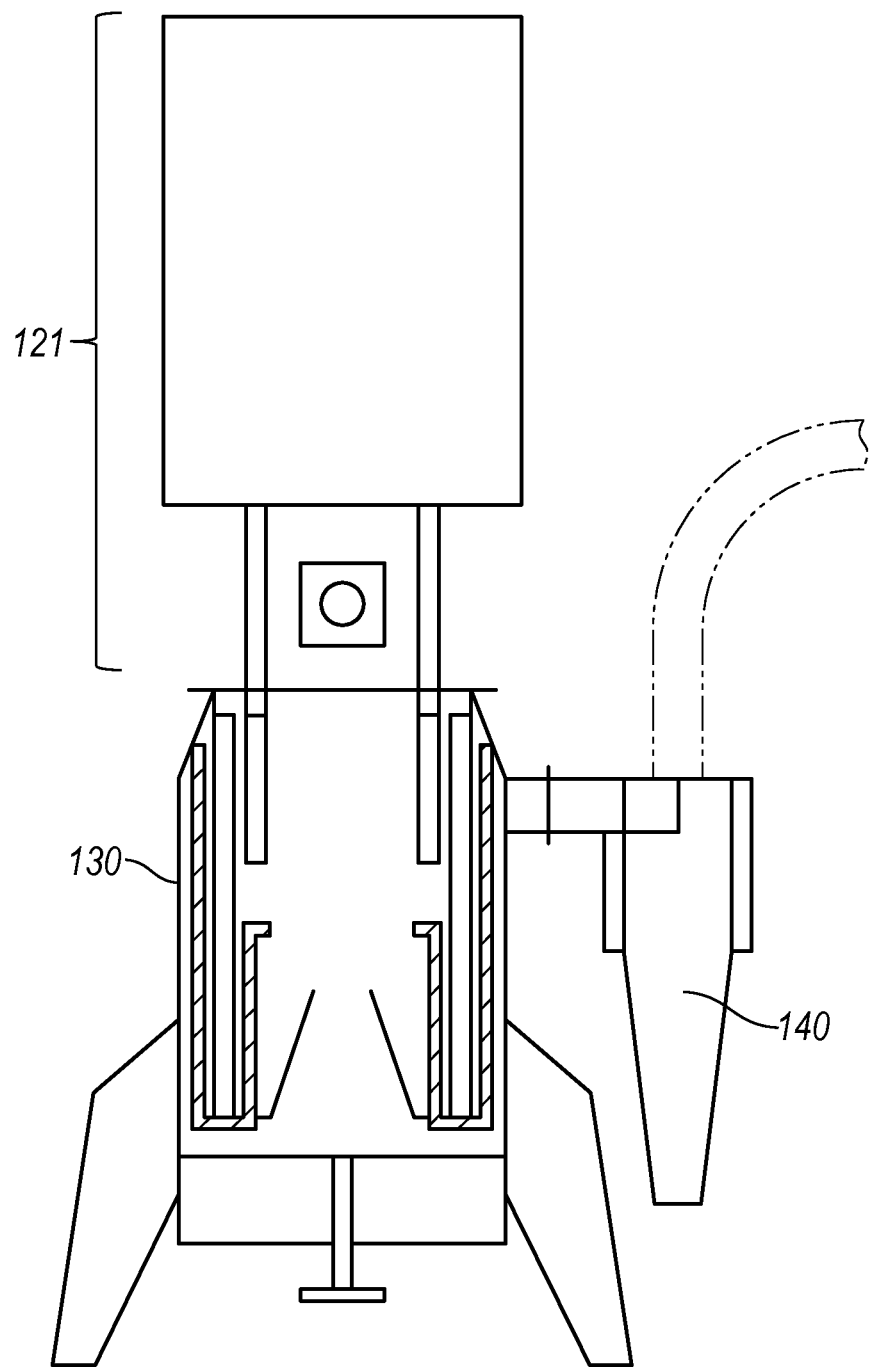
FIG. 11 is a schematic representation of an alternative arrangement of the downdraft gasifier of the preferred embodiments with the pyrolysis module and dryer module combined.

The downdraft gasifier 100 of the preferred embodiments is preferably of one of the variations as described above, but may alternatively be any other suitable arrangement of the processes of gasification that utilizes heat exchange relationships as described above or any other suitable variation of heat exchange relationships as described above. For example, it is conceivable that the dryer module 110 and the pyrolysis module 120 may be combined into a dryer/pyrolysis module 121, as shown in FIG. 11, that includes a condensing portion above a pyrolysis portion. Heat from the gaseous fuel output and the exhaust of the engine may be cooperatively used to vaporize water from the carbonaceous material that is inserted into the dryer/pyrolysis module. The vaporized water then condenses on the condensing portion above the pyrolysis portion and the combined heat energy is used to pyrolyze the dried carbonaceous fluid. However, any other suitable variation may be used.

As described above, the components of the downdraft gasifier 100 of the preferred embodiments are each substantially interconnected with a substantial amount of heat and material recycling that addresses many of the hurdles of using downdraft gasification to produce cleaner gaseous fuel relative to updraft gasification and provides a viable solution for downdraft gasification as a renewable and sustainable energy source. The downdraft gasifier 100 of the preferred embodiments provides a powerful new method and system for thermally integrating waste heats within a gasifier and/or engine to drive gasification to produce additional gaseous fuel. The downdraft gasifier 100 is also made of substantially simple components, allowing construction to be relatively simple, inexpensive, and small scale, which may encourage users to build and use the downdraft gasifier 100 as a personal energy source.

As a person skilled in the art will recognize from the previous detailed description and from the figures and claims, modifications and changes can be made to the preferred embodiments of the invention without departing from the scope of this invention defined in the following claims.

I claim:

1. A downdraft gasifier system for producing a gaseous fuel from a carbonaceous material, the downdraft gasifier system comprising:
    a dryer module;
    a pyrolysis module fluidly connected to the dryer module;
    a reactor module fluidly connected to the pyrolysis module, the reactor module comprising an air path fluidly connecting an oxygen source to a reactor module interior, and a gaseous fuel outlet;
    an engine comprising an engine inlet and an exhaust outlet, and
    a heat exchanger system comprising:
        a first heat exchanger thermally coupled to and fluidly separated from the dryer module, the first heat exchanger fluidly coupled between the gaseous fuel outlet and the engine inlet;
        a second heat exchanger thermally coupled to and fluidly isolated from the pyrolysis module, fluidly coupled to the engine exhaust; and
        a third heat exchanger thermally coupled to and fluidly separated from the air path, the third heat exchanger fluidly coupled between the gaseous fuel outlet and the first heat exchanger.

2. The downdraft gasifier of claim 1, further comprising a heat extractor that further extracts heat from the gaseous fuel from the reactor module prior to the first heat exchanger.

3. The downdraft gasifier of claim 2, wherein the heat extractor includes a cyclone module that cooperates with the dryer module, pyrolysis module, and the reactor module to further extract particulates and heat from the gaseous fuel from the reactor module, wherein the cyclone includes a gaseous fuel inlet that receives gaseous fuel from the reactor module, a gaseous fuel path within the cyclone module that extracts heat and particulates from the gaseous fuel, and a gaseous fuel outlet that delivers gas to the first heat exchanger.

4. The downdraft gasifier of claim 2, wherein the heat extractor further includes a fourth heat exchanger that exchanges heat with the gaseous fuel to extract heat from the gaseous fuel.

5. The downdraft gasifier of claim 4, wherein the fourth heat exchanger heats water with the gaseous fuel to extract heat from the gaseous fuel.

6. The downdraft gasifier of claim 5, wherein the carbonaceous material is dried by extracting water content in the carbonaceous material, and wherein the fourth heat exchanger heats the water extracted from the carbonaceous material.

7. The downdraft gasifier of claim 5, wherein the fourth heat exchanger includes a water inlet that receives water, a water path substantially isolated from the gaseous fuel, and a water outlet.

8. The downdraft gasifier of claim 7, wherein fourth heat exchanger substantially vaporizes the water with the heat from the gaseous fuel and wherein the water outlet outputs water vapor into the reactor module.

9. The downdraft gasifier of claim 7, wherein the gaseous fuel path traverses about the cyclone module at least once.

10. The downdraft gasifier of claim 9, wherein the gaseous fuel path revolves about the cyclone module at least once.

11. The downdraft gasifier of claim 1, wherein the dryer module substantially isolates drying from pyrolyzing, and wherein the pyrolysis module substantially isolates pyrolyzing from combusting and reducing.

12. The downdraft gasifier of claim ii, wherein the dryer module includes a drying portion and a condensing portion arranged substantially above the drying portion, wherein the dryer module vaporizes the water content in the carbonaceous material in the drying portion and condenses the rising water vapor in the condensing portion away from the carbonaceous material, thereby drying the carbonaceous material and substantially isolating drying from pyrolyzing.

13. The downdraft gasifier of claim 11, wherein the pyrolysis module is arranged above the reactor and includes a tar gas and charcoal outlet that is coupled to the reactor, and wherein the reactor receives the tar and charcoal from the tar gas and charcoal outlet of the pyrolysis module.

14. The downdraft gasifier of claim 13, wherein the tar gas and charcoal outlet includes a motor that drives the tar gas and charcoal outlet into the reactor.

15. The downdraft gasifier of claim 1, wherein the reactor is an Imbert type reactor.

16. The downdraft gasifier of claim 1, wherein the first heat exchanger includes a gaseous fuel inlet that receives gaseous fuel from the reactor module, a gaseous fuel path substantially isolated from the carbonaceous material, and a gaseous fuel outlet.

17. The downdraft gasifier of claim 16, wherein the gaseous fuel path traverses about the dryer module at least once.

18. The downdraft gasifier of claim 17, wherein the gaseous fuel path traverses about the dryer module in a substantially zigzag pattern.

19. The downdraft gasifier of claim 17, wherein the dryer module includes an inner jacket and an outer jacket, and wherein the gaseous fuel path is cooperatively defined by the inner wall of the outer jacket and the outer wall of the inner jacket.

20. The downdraft gasifier of claim 19, wherein the inner wall of the outer jacket includes baffles that cooperate with the outer wall of the inner jacket to define the gaseous fuel path.

21. The downdraft gasifier of claim 1, wherein the second heat exchanger includes an exhaust gas inlet that receives exhaust gas from the engine, an exhaust gas path substantially isolated from the dried carbonaceous material, and an exhaust gas outlet.

22. The downdraft gasifier of claim 21, wherein the exhaust gas path traverses about the pyrolysis module at least once.

23. The downdraft gasifier of claim 22, wherein the exhaust gas path traverses about the pyrolysis module in a substantially zigzag pattern.

24. The downdraft gasifier of claim 1, wherein the third heat exchanger includes an air inlet that receives air, an air path substantially isolated from the contents of the reactor and the gaseous fuel output from the reactor, and an air outlet that allows the preheated air to exit into the reactor to combust the tar gas.

25. The downdraft gasifier of claim 24, wherein the flow of the air in the air path is substantially cross-current with the flow of the gaseous fuel output from the reactor.

26. The downdraft gasifier of claim 25, further comprising a gas cowling that substantially envelopes the reactor module and cooperates with the reactor module to define an annular space between the reactor module and the gas cowling, wherein the gaseous fuel output of the reactor is directed out the bottom of the reactor, into the annular space, and upwards around the reactor through the annular space, and wherein the air path is arranged within the annular space and the air flow within the air path is substantially downward.

27. The downdraft gasifier of claim 24, wherein the air path traverses about the reactor module at least once.

28. The downdraft gasifier of claim 27, wherein the third heat exchanger includes heat conductive tubing that is wound around the reactor module and that defines the air path.

29. The downdraft gasifier of claim 1, further comprising a carbonaceous material transporter that transports the carbonaceous material into the dryer module and subsequently transports the dried carbonaceous material substantially directly into the pyrolysis module.

30. The downdraft gasifier of claim 29, wherein the carbonaceous material transporter includes an auger.

31. The downdraft gasifier of claim 30, further comprising a motor coupled to the auger.

32. A downdraft gasifier for producing a gaseous fuel from a carbonaceous material, the downdraft gasifier comprising:
a dryer module;
a pyrolysis module fluidly connected to the dryer module;
a reactor module fluidly connected to the pyrolsis module;
an air path fluidly connected between an air source and a reactor module interior;
a cyclone module;
an engine comprising an engine inlet and an engine outlet, and
a heat exchanger system comprising:
a first heat exchanger, thermally coupled to the dryer module and fluidly connected between the cyclone module and the engine inlet, that traverses about the dryer module at least once and is fluidly separated from a dryer module interior;
a second heat exchanger, thermally coupled to the pyrolysis module and fluidly connected to the engine exhaust, that traverses about the pyrolysis module at least once and is fluidly separated from a pyrolysis module interior;
a third heat exchanger, thermally coupled to the air path and fluidly connected between the reactor module and the cyclone module, that traverses about the reactor module at least once and is fluidly separated from a reactor module interior; and
a heat extractor thermally coupled to the cyclone module and fluidly separated from a fluid path of the first and third heat exchangers.

* * * * *